United States Patent
Zhdankin

(10) Patent No.: US 7,584,191 B2
(45) Date of Patent: Sep. 1, 2009

(54) MODELING OF HETEROGENEOUS MULTI-TECHNOLOGY NETWORKS AND SERVICES BY METHOD OF TRANSLATION OF DOMAIN-FOCUSED USER INFORMATION MODEL TO COMMON INFORMATION MODEL

(75) Inventor: Aleksandr V. Zhdankin, Indialantic, FL (US)

(73) Assignee: Harris Stratex Networks, Inc., Morrisville, NC (US)

( * ) Notice: Subject to any disclaimer, the term of this patent is extended or adjusted under 35 U.S.C. 154(b) by 344 days.

(21) Appl. No.: 11/214,107

(22) Filed: Aug. 29, 2005

(65) Prior Publication Data

US 2007/0050363 A1   Mar. 1, 2007

(51) Int. Cl.
*G06F 7/00* (2006.01)
*G06F 17/30* (2006.01)

(52) U.S. Cl. ............................ 707/9; 707/102; 719/328

(58) Field of Classification Search ............... 707/1–10, 707/100–104.1, 200–206; 709/230, 203–210, 709/225, 246; 719/328; 715/716–726
See application file for complete search history.

(56) References Cited

U.S. PATENT DOCUMENTS 5,606,702 A * 2/1997 Diel et al. .................... 719/329
6,976,262 B1 * 12/2005 Davis et al. .................. 719/328

OTHER PUBLICATIONS

Patrick Thompson et al., "Successfill Practices in Developing a Complex Information Model," Conceptual Modeling- ER '97.16t Annual-International Conference on Conceptual Modeling, Berlin, Germany, 1997 pp. 376-393.*
Tosic et al., The Common Information Model (CIM) standard—an analysis of features and open issues, Oct. 13-15, 1999, IEEE, vol. 2, 677-680.*
Kumar, et al., Moving from data modeling to process modeling in CIM, May 15-19, 2005, IEEE, 673-686.*

* cited by examiner

*Primary Examiner*—Jean B Fleurantin
(74) *Attorney, Agent, or Firm*—Sheppard, Mullin, Richter & Hampton LLP

(57) ABSTRACT

A domain-focused User Information Model (UIM) generating methodology automatically translates conventional resource terminology employed by a user in his everyday relationships with a managed system of interest into associated functional operators within the realm of the Common Information Model (CIM), so that the CIM is generated, yet the user 'views' and interfaces with the CIM through the domain-focusing lens of the UIM.

10 Claims, 3 Drawing Sheets

MODELING OF HETEROGENEOUS MULTI-TECHNOLOGY NETWORKS AND SERVICES BY METHOD OF TRANSLATION OF DOMAIN-FOCUSED USER INFORMATION MODEL TO COMMON INFORMATION MODEL

FIELD OF THE INVENTION

The present invention relates in general to fault diagnostic and configuration management of multi-technology, heterogeneous systems, networks and services, and is particularly directed to a domain-focusing, model-translating or mapping methodology, through which systems and subsystems thereof with which a user is familiar are modeled into a normalized domain, in particular in accordance with a common information model that is configured to describe all resources in a uniform fashion.

BACKGROUND OF THE INVENTION

One of the most important aspects involved in the management of systems, network, and services is the need to create a model of the resources being managed, that is thorough enough to perform fault isolation, alert correlation, root-cause and service impact analysis, and yet will provide intuitive and easy to understand representations of the resources to end-users—the operators and technicians responsible for system monitoring and maintenance. Many standards development organizations (e.g., ITU, TINA, TMF, etc.) have created different models, separately describing different areas of problem domain. However, if one is faced with the task of managing networks that span several distinct and separately standardized problem domains, it becomes very difficult to build a shared knowledge base, or model, and apply a common set of rules and procedures in order to perform fault isolation, alert correlation, root-cause and service impact analysis.

FIG. 1 shows a conventional 'classic' approach to network and services modeling, comprised of a service management model at a service layer 100, which is coupled with a transport resources management model at a network layer 200, and communication information models (SONET, ATM, and SDH) at a network element layer 300. Using this paradigm becomes even more difficult, when taking into account the fact that some of the communication equipment performs functions in several domains (e.g., an ATM multiplexer with DSH/SONET line interfaces).

In an effort to remedy shortcomings of the classical approach of FIG. 1, it has been proposed to build a 'Common' or universal model that will describe all resources in a uniform or 'normalized' fashion. One relatively well know example of this is the Common Information Model (CIM) developed by DMTF (www.dmtf.org). The CIM approach allows fault isolation, alert correlation, root-cause and service impact analysis tasks to be performed across multiple domains of equipment, network and service management efficiently. However, it suffers the problem of being a domain oriented representation of the managed resources to the user. This means that something as familiar as classical SDH equipment will be now be represented in a completely different manner to operators and technicians who have studied, used and become familiar with that equipment for years.

To illustrate this difficulty, consider the CIM representation in FIG. 2 of a microwave radio 20. As shown therein, user-familiar attributes of the radio (exclusive of CIM modeling) may include its name 21 (e.g., 'my radio'), an IP address 22 (137.237.1.1), a scan address 23 (99), and a network IP address 24 (192.168.1.2). This is how the radio presents itself to the user in a familiar manner (namely, how the user perceives the radio). Through CIM modeling, however, a first 'functional attribute' of the radio becomes a CIM computer system 31, which has the name attribute 'my radio'. There is usually an associated set of additional (ten to twenty) attributes in the CIM model shown at 32, but something in which the user customarily has no particular interest. Branching from the principal functional element—the CIM computer system—are a plurality of 'hosted access points', a first of which is a CIM IP Protocol End Point 33, which corresponds to the IP address 22 of the radio (i.e., 137.237.1.1) and perhaps another five or six additional attributes, again something the user does not care about. Branching from a second 'hosted access point' is a CIM IP address 34, which corresponds to the network IP address 24 of the radio (i.e., 192.168.1.2); and branching from a third hosted access point is a third instance 35 of a scan protocol end point—the scan address 23 (99) of the radio.

It can be seen that CIM models resources in a very detailed and highly normalized fashion. It focuses on enterprise management, where everything is modeled down to a very fine detail. The structure of CIM—how the model breaks down the classes of managed elements and sets up relationships between them—allows most of the root cause/service and resource impact analysis tasks to be performed using a set of fixed, predefined business rules.

However, with all of the advantages and power of the CIM approach, there are certain drawbacks. One of them is the fact that it is harder to build applications that are focused on a particular area, like fault and configuration management, inventory, etc. CIM is too replete with functional definitions for each of the individual business domains. For example, it provides the operator with the primary focus in fault management a lot of pure inventory related information, which the operator doesn't really care about.

SUMMARY OF THE INVENTION

In accordance with the present invention, rather than force the user to learn a completely new (and potentially technologically obtuse) set of definitions and visual attributes to describe all of the attributes of services, networks or network elements, that conform with a normalized standard, such as the Common Information Model, the user can continue to use (domain-focused) resource definitions with which he is familiar, and can apply these definitions and terms to a given instantiation of a User Information Model (UIM), when modeling services, networks or network element layers. As will be described, the domain-focused UIM effectively performs the task of automatically translating conventional resource terminology employ by the user in his everyday relationships with a system of interest into associated functional operators within the realm of the Common Information Model, so that the CIM is generated, yet the user 'views' and interfaces with the CIM through the domain-focusing lens of the UIM. In other words, the UIM according to the invention effectively performs the task of automatically translating conventional resource terminology employ by the user in his everyday relationships with a system of interest into associated functional operators within the realm of the highly normalized Common Information Model, so that the CIM is generated, yet the user 'views' and interfaces with the CIM through the lens of the UIM.

For this purpose, as an initial step in the process in accordance with the present invention, it is necessary to define the relationship between the user's perception of the (system, network, network element) attribute of interest and the actual functional object employed by the core modeling system to completely model that attribute. The modeled entity is defined by a set of references that are used to translate all of the attributes of the particular instantiation of the User Information Model (those attributes of the entity that the user perceives) with associated one or more attributes of the Common Information Model (what the user neither sees nor wants to see). The translation relationships are based upon a knowledge of the modeled entity and the manner in which that modeled entity is modeled into functional objects by the CIM. From a network element perspective of the microwave radio example of FIG. 2, referenced above, this involves the specification of respective sets of translation references between each of the elements of the radio, and associated one of the functional objects of the CIM, including the CIM computer system, the associated set of additional attributes in the CIM, as well as the branches from the hosted access points.

Next, the translation references are stored, so as to be available for use by a management and maintenance operator whose task it is to perform management and diagnostics on a microwave radio per se, or a network containing the radio, attributes of which are defined by the domain-focused instantiation of the UIM that served as the basis of the CIM translator, and which will be available to the user. Once the translation references have been stored, the UIM is available for the generation of a CIM, and for enabling a user to interface with the CIM, but without having to know or use CIM attributes. This ability to interface with the CIM using only UIM attributes significantly relieves the burden on the user who has had to learn CIM functionality and its associated rule structure. It is no longer necessary for a user unfamiliar with the highly normalized structure of CIM to have to learn its functional object structure. The user need only employ attributes and terminology with which he is familiar, as captured via the UIM.

DETAILED DESCRIPTION

Figure 1:
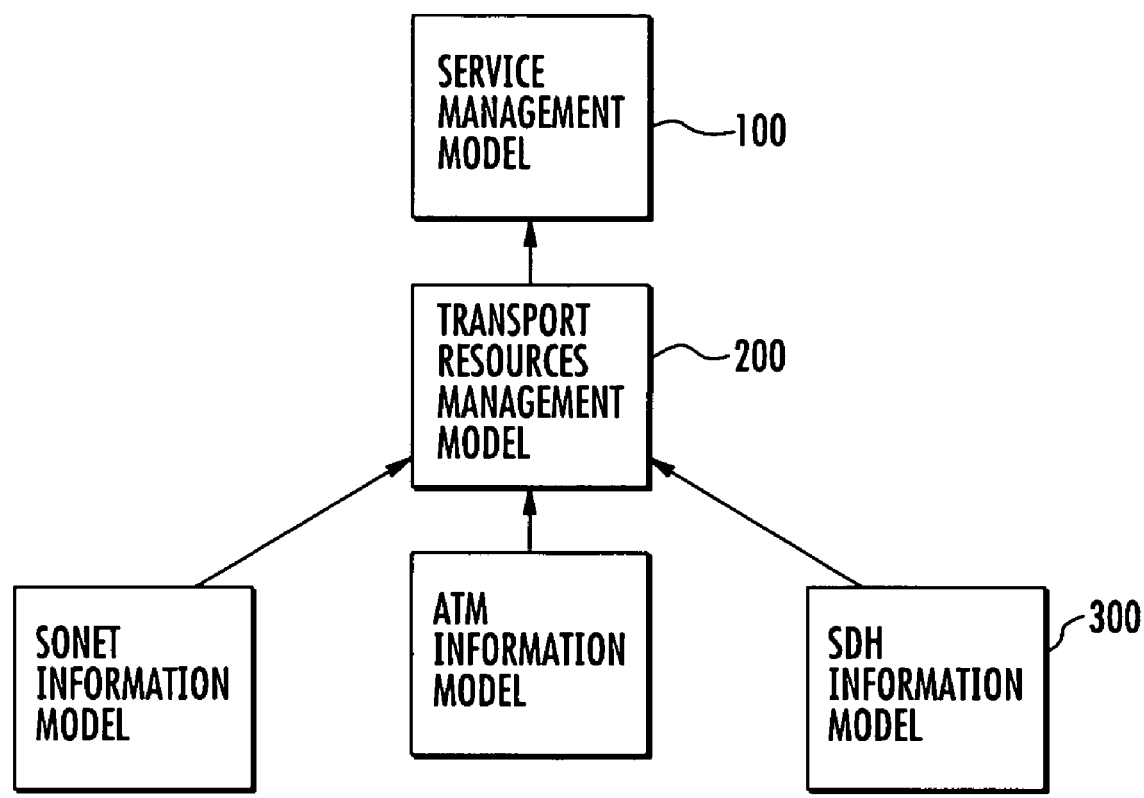
FIG. 1 shows a conventional approach to network and services modeling, comprised of a service management model, a transport resources management model and communication information models.

Before describing the user information model-based to CIM-based translation methodology in accordance with the present invention, it should be observed that the invention resides primarily in prescribed sets or instantiations of User Information Model-to-Common Information Model relationships, that have been shown in the drawings by readily understandable block and flow diagrams, which show only those specific aspects that are pertinent to the present invention, so as not to obscure the disclosure with details which will be readily apparent to those skilled in the art having the benefit of the description herein. Thus, the block and flow diagrams are primarily intended to show the major components of a preferred embodiment of the invention in convenient functional groupings, whereby the present invention may be more readily understood.

As pointed out briefly above, the UIM according to the present invention effectively performs the task of automatically translating conventional resource terminology employ by the user in his everyday relationships with a service, network or network elements of interest into associated functional operators within the realm of the Common Information Model, so that the CIM is generated, yet the user 'views' and interfaces with the CIM through the lens of a domain-focused UIM. For this purpose, as an initial step in the process in accordance with the present invention, it is necessary to define the relationship between the user's perception of the (system, network, network element) attribute of interest and the actual functional object employed by the core modeling system to completely model that attribute.

Figure 2:
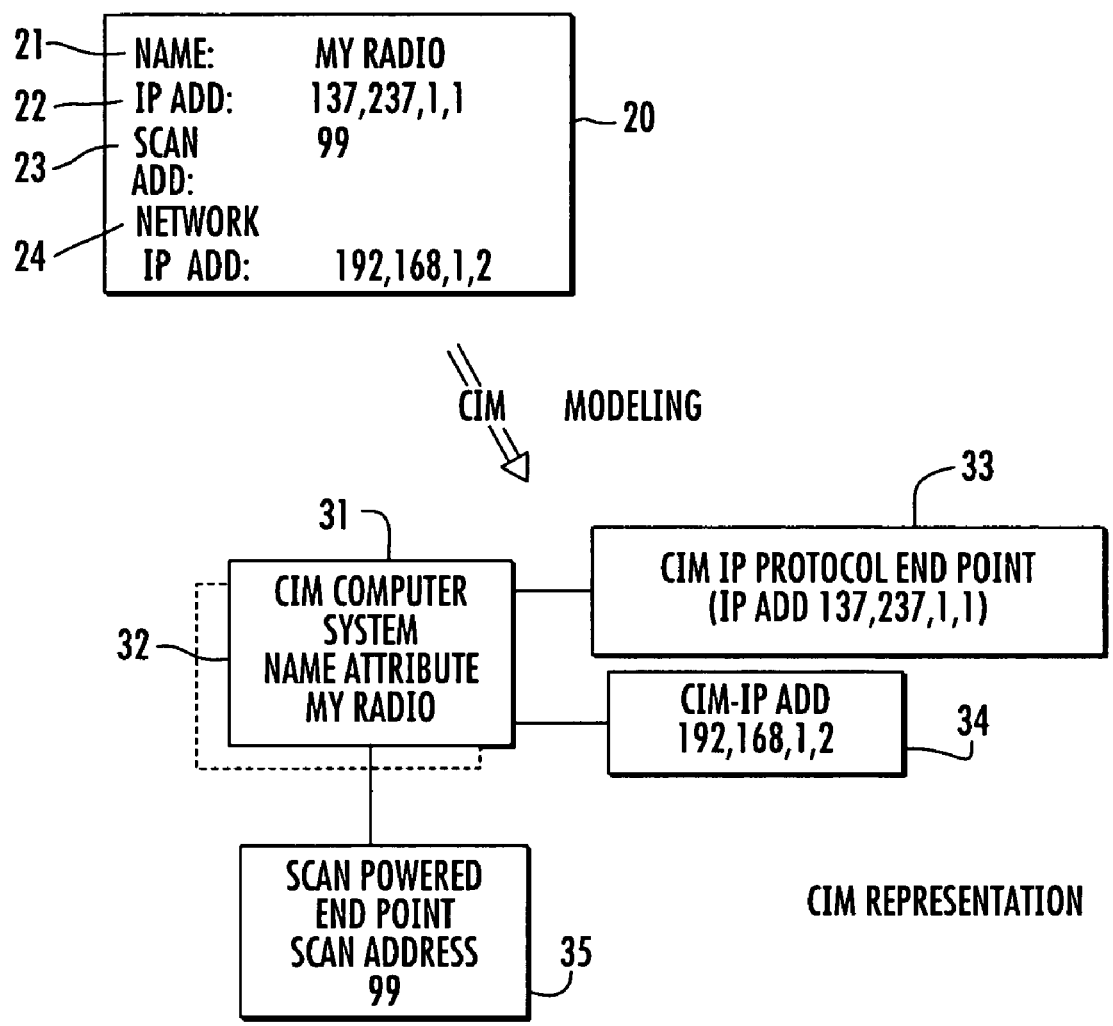
FIG. 2 diagrammatically illustrates a CIM representation of a microwave radio.
Figure 3:
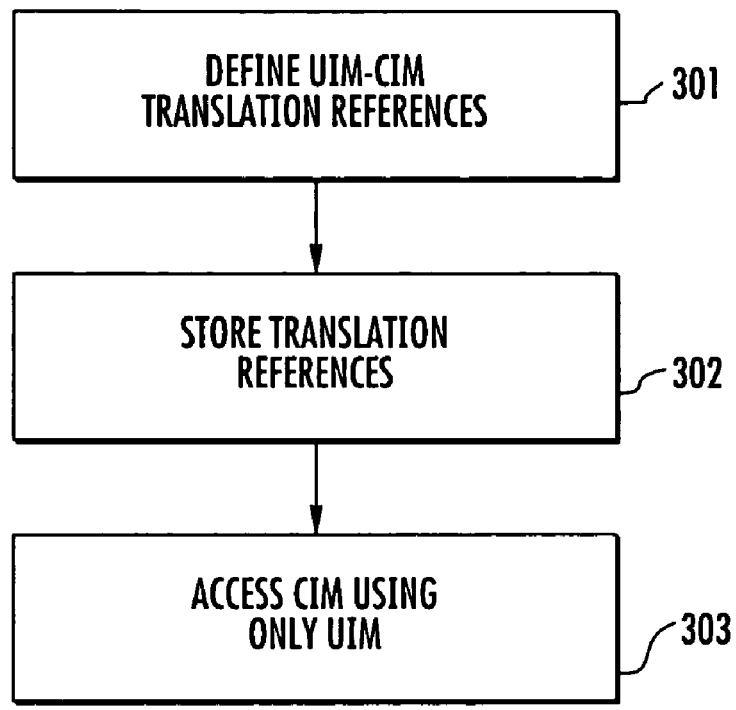
FIG. 3 is a flowchart showing respective steps of the methodology of the present invention.

For the microwave radio example shown in FIG. 2, described above, this is diagrammatically shown at step 301 in the flowchart of FIG. 3, wherein the modeled object/entity (e.g., here a network element—radio) is defined by a set of references that are used to translate all of the attributes of the user information model (those attributes of the radio that the user perceives) with associated one or more attributes of the common information model (what the user neither sees nor wants to see). The translation relationships are based upon a knowledge of the modeled object and the manner in which that modeled object is modeled into functional objects by the CIM. For the non-limiting example of FIG. 2, step 301 would involve the specification of respective sets of translation references between each of the elements of the radio, and associated one of the functional objects of the CIM, including the CIM computer system 31, the associated set of additional attributes in the CIM model shown at 32, as well as the three branches from the hosted access points (the CIM IP Protocol End Point 33, the CIM IP address 34, and the third instance 35 of a scan protocol end point—the scan address of the radio).

Next, in step 302, the translation references generated in step 301 are stored, so as to be available for use by a management and maintenance operator whose task it is to perform management and diagnostics on a microwave radio per se, or a network containing the radio, attributes of which are defined by the UIM that served as the basis of the CIM translator, and which will be available to the user.

Once the translation references generated in step 301 have been stored in step 302, the UIM is available for the generation of a CIM, and for enabling a user to interface with the CIM, but without having to use CIM attributes. This ability to interface with the CIM using only UIM attributes as shown at step 303 significantly relieves the burden on the user who has had to learn CIM functionality and its associated rule structure. It is no longer necessary for a user unfamiliar with the highly normalized structure of CIM to have to learn its functional object structure. The user need only employ attributes and terminology with which he is familiar, as captured via the UIM.

Figure 4:
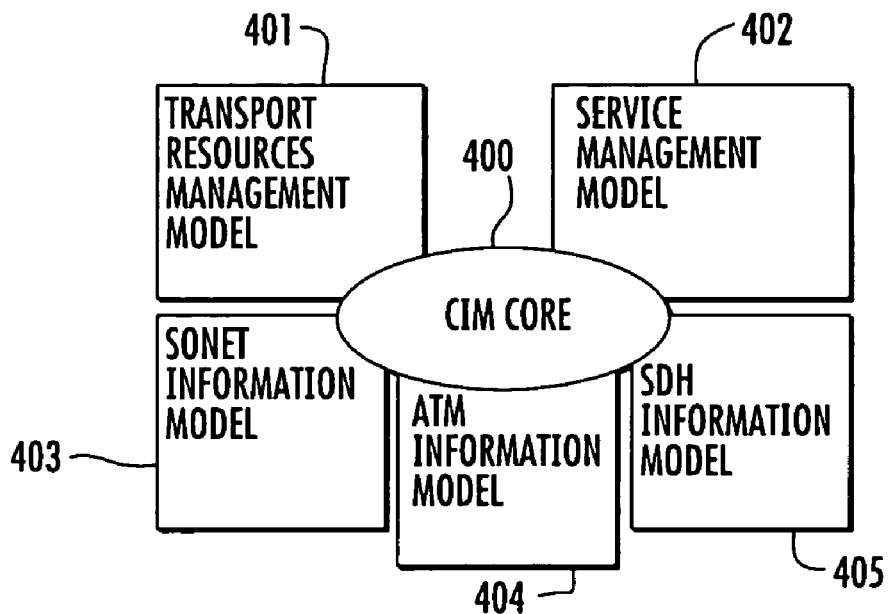
FIG. 4 diagrammatically illustrates multiple domain focused view-based UIMs surrounding a CIM core.

Now although the methodology described above involves the generation of a UIM from the standpoint of a classical hardware perspective, as pointed out previously, the invention is not limited to the generation of only a single instantiation of UIM, nor is it limited to a hardware perspective only. Rather, a UIM generated in accordance with the present invention is intended to be 'domain-focused', so that for any particular system, it can be expected that multiple UIMs will be generated, each instantiation of a UIM being tailored or focused to translate from a given domain into the CIM, such as the multiple domain focused view-based UIMs surrounding the CIM core 400 in FIG. 4. Each respectively different instantiation of the UIM is defined so as to describe the managed resources in terms specific to the particular management area and provide a domain-focused view of the Common Information Model. FIG. 4 shows respective instantiations of the UIM as including a service management model 401, a transport resources management model 402 and respectively different communication protocol management models 403, 404 and 405, each being stored in a storage device.

As will be appreciated from the foregoing description, the domain-focused User Information Model generating methodology in accordance with the present invention effectively performs the task of automatically translating conventional resource terminology employ by the user in his everyday relationships with a system of interest into associated functional operators within the realm of the Common Information Model, so that the CIM is generated, yet the user 'views' and interfaces with the CIM through the domain-focusing lens of the UIM. In other words, the UIM according to the invention effectively performs the task of automatically translating conventional resource terminology employed by the user in his everyday relationships with a managed entity of interest into associated functional operators within the realm of the highly normalized Common Information Model, so that the CIM is generated, yet the user 'views' and interfaces with the CIM through the lens of the UIM.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of modeling a technology entity comprising the steps of:
   generating a representation of said entity, said representation having user-associated attributes that are generally familiar to a user of said entity;
   generating a highly normalized common information model (CIM) of said entity, said CIM having functional object attributes that are generally unfamiliar to a user of said entity;
   generating a User Information Model (UIM) translation operator that is effective to specify one or more of said functional object attributes of said CIM given one or more of said user-associated attributes of said representation of said entity, by generating a respective instantiation of said UIM translation operator in accordance with a domain-focused view of said CIM that is one of a service management model, a transport resources management model and a communication protocol management model;
   storing the UIM translation operator in a storage device; and
   in response to said one or more of said user-associated attributes of said representation of said entity, causing said UIM translation operator to specify said one or more of said functional object attributes of said CIM, thereby modeling said technology entity in CIM, while interfacing with the CIM of said technology entity via said UIM.

2. The method according to claim 1 further including providing a radio as said technology entity.

3. A computer readable storage device comprising a resource management software module that is operative, when executed by a processor, to model a technology entity by performing the steps of:
   generating a plurality of representations of said technology entity, each having user-associated attributes;
   generating a common information model (CIM) of said entity, said CIM having functional object attributes;
   providing, for each of said plurality of representations, a User Information Model (UIM) translation operator, defining multiple UIM translation operators each of which specifies one of said functional object attributes of said CIM; and
   in response to said user-associated attributes of one of said plurality of representations, causing one of said plurality of UIM translation operators corresponding thereto to specify said functional object attributes of said CIM, thereby modeling said technology entity in CIM, while interfacing with the CIM of said technology entity via said one of said plurality of UIM translation operators.

4. The computer readable storage device comprising the resource management software method according to claim 3, wherein providing further comprises generating a respective instantiation of said one of said plurality of UIM translation operators in accordance with a domain-focused view of said CIM.

5. The computer readable storage device comprising the resource management software module according to claim 4, wherein said respective instantiation comprises one of a service management model, a transport resources management model and a communication protocol management model.

6. The computer readable storage device according to claim 3 further including a radio as said technology entity.

7. A method of modeling a technology entity, said method comprising:
   generating multiple representations of said entity, each of which has a set of associated attributes;
   producing a common information model (CIM) of said entity, said CIM having functional object attributes;
   obtaining, for each of said multiple representations of said entity, a User Information Model (UIM) translation operator, producing multiple UIM translation operators, each of which specifies one of said functional object attributes of said CIM given said set of associated attributes of said representation corresponding thereto;
   storing the UIM translation operator in a storage device; and
   selecting one of said multiple UIM translation operators, defining a selected UIM translation operator; and
   in response to said one or more of said user-associated attributes of said representation of corresponding to said selected UIM, causing said UIM translation operator to specify said one or more of said functional object attributes of said CIM, thereby modeling said technology entity in CIM, while interfacing with the CIM of said technology entity via said UIM.

8. The method according to claim 7 wherein selecting further includes generating a respective instantiation of said UIM translation operator in accordance with a domain-focused view of said CIM.

9. The method according to claim 8 wherein said respective instantiation of said UIM comprises one of a service management model, a transport resources management model and a communication protocol management model.

10. The method according to claim 7 further including providing a radio as said technology entity.

* * * * *